(12) United States Patent
Uhl

(10) Patent No.: US 7,276,812 B2
(45) Date of Patent: Oct. 2, 2007

(54) METHOD AND DEVICE FOR NON-CONTACT ENERGY TRANSMISSION

(75) Inventor: Thomas Uhl, Bruchsal (DE)

(73) Assignee: Sew-Eurodrive GmbH & Co., Bruchsal (DE)

( * ) Notice: Subject to any disclaimer, the term of this patent is extended or adjusted under 35 U.S.C. 154(b) by 345 days.

(21) Appl. No.: 10/415,361

(22) PCT Filed: Oct. 4, 2001

(86) PCT No.: PCT/EP01/11446

§ 371 (c)(1),
(2), (4) Date: Apr. 25, 2003

(87) PCT Pub. No.: WO02/35676

PCT Pub. Date: May 2, 2002

(65) Prior Publication Data

US 2004/0051628 A1    Mar. 18, 2004

(30) Foreign Application Priority Data

Oct. 27, 2000   (DE) .................................. 100 53 373

(51) Int. Cl.
*H02J 3/10* (2006.01)
*H02J 3/38* (2006.01)
(52) U.S. Cl. .............................. 307/61; 307/59; 307/60
(58) Field of Classification Search .................. 307/59, 307/60, 61
See application file for complete search history.

(56) References Cited

U.S. PATENT DOCUMENTS

| | | | | |
|---|---|---|---|---|
| 4,916,599 A | * | 4/1990 | Traxler et al. ................. | 363/65 |
| 5,576,940 A | * | 11/1996 | Steigerwald et al. .......... | 363/17 |
| 5,768,117 A | * | 6/1998 | Takahashi et al. ............ | 363/65 |
| 5,831,841 A | | 11/1998 | Nishino | |
| 6,081,437 A | | 6/2000 | Chen et al. | |
| 6,278,624 B1 | * | 8/2001 | Nelson ........................ | 363/65 |
| 6,462,432 B1 | | 10/2002 | Seelig et al. | |

FOREIGN PATENT DOCUMENTS

| | | |
|---|---|---|
| DE | 197 35 624 | 12/1998 |
| EP | 0 818 868 | 1/1998 |
| EP | 818868 A2 * | 1/1998 |
| WO | WO99/08359 | 2/1999 |

* cited by examiner

*Primary Examiner*—Michael Sherry
*Assistant Examiner*—Hal I Kaplan
(74) *Attorney, Agent, or Firm*—Kenyon & Kenyon LLP

(57) ABSTRACT

A method and a device for non-contact energy transmission from one or more medium-frequency current sources, whose medium frequencies may have deviations around $f_M$, to one or more moving consumers via one or more transmission lines and from or via transformer heads, allocated to the moving consumers, having one or more downstream matching controllers for adjusting the power received from the transmission lines. The currents fed into a matching controller are brought together with the aid of a single switch, depending upon the power demand of the consumers connected to the matching controller. The switching frequency of the switch is selected as a fixed value from a 10%-wide tolerance band around $1/f_M$. The output voltages of a plurality of matching controllers are able to be parallel-connected via diodes for supplying a consumer.

11 Claims, 5 Drawing Sheets

METHOD AND DEVICE FOR NON-CONTACT ENERGY TRANSMISSION

FIELD OF THE INVENTION

The present invention relates to a method and a device for non-contact energy transmission.

BACKGROUND INFORMATION

German Published Patent Application No. 197 35 624 describes a method for the non-contact transmission of electric power from a medium-frequency current source having a medium frequency $f_M$ to one or more moving consumers via a transmission line, and from or via transformer heads, allocated to the moving consumers, having a downstream matching controller for adjusting the power received from the transmission line, the transmission line being fed from the medium-frequency current source with a medium-frequency current that is constant in its effective value during power transmission.

The matching controller converts the medium-frequency current, injected from the transformer head, into a DC voltage. As described in FIGS. 3, 7a and 7b and the associated specification of German Published Patent Application No. 197 35 624, switch $T_s$ is operated synchronously with respect to the characteristic, and with double the frequency of the input current of the matching controller. However, an important disadvantage may be that this high switching frequency $2f_M$ results in high switching losses. Another disadvantage may be that the synchronous principle can no longer be maintained when using a plurality of asynchronously operating feed-ins for supplying a matching controller.

Therefore, it is an object of the present invention to provide a method and a device for non-contact energy transmission, that may realize a low switching frequency of the switch and the use of asynchronously operating feed-ins for supplying a matching controller.

SUMMARY

The foregoing object may be achieved according to the present invention by providing a method for non-contact energy transmission as described herein and by providing a device for use when working with such a method as described herein.

Features of the invention with respect to the method for non-contact energy transmission are that energy is transmitted from one or more medium-frequency current sources, whose frequencies may have small deviations around medium frequency $f_M$, to at least one moving consumer via one or more transmission lines and transformer heads, allocated to the consumers, having a downstream matching controller for adjusting the power received from the transmission line, a transmission line is fed from a medium-frequency current source with a medium-frequency current that is constant in its effective value during the power transmission, the respective consumer is supplied with energy from at least one matching controller having at least one feed-in, one or more fed currents are each rectified in a rectifier, smoothed in each case by a link-circuit reactor and brought together, with the aid of a switch, the link-circuit current, brought together in each instance, is either supplied to a link-circuit capacitor buffering output voltage $U_=$ of the matching controller, or is shunted upstream of the link-circuit capacitor, depending upon the power demand of the consumers, and the respective switch is switched in such a manner that switching frequency $1/T$ is less than double the medium frequency, thus, $1/T<2\ f_M$.

In this context, it may be provided that the switching losses are less than for methods which assume a switching frequency of $2f_M$, and that not only synchronously operating, but also a plurality of asynchronously operating feed-ins may be usable for supplying a matching controller. In addition, the current flow may be controllable by a single switch.

In an example embodiment according to the present invention, switching frequency $1/T$ may be selected as a value between $0.5\ f_M$ and $1.5\ f_M$. It may be possible to use a link-circuit reactor having the smallest possible size, accompanied by the lowest possible switching losses.

In an example embodiment of the present invention, the switch is switched periodically with a frequency $1/T$ and asynchronously with respect to one or more middle-frequency feed-ins in such a manner that there is no constant phase relationship to the currents of one or more feed-ins. The method may be robustly executable, and it may be possible to save on device(s) for synchronization.

In an example embodiment of the present invention, the link-circuit reactor is configured in such a manner that the link-circuit current does not pulsate during operation. In spite of the aforesaid low switching frequency, a continuous power flow may be ensured.

In an example embodiment of the present invention, the frequencies of the medium-frequency feed-ins have deviations around $f_M$. The feed-ins may not have to be synchronized with each other.

In accordance with an example embodiment of the present invention with respect to the device, the arrangement for driving the respective switch may include no arrangement for synchronization to the medium-frequency feed-ins. The driving may be simple, cost-effective and, in particular, robust with respect to interference effects in the case of asynchronously operating feed-ins.

In an example embodiment of the present invention, the arrangement for driving the respective switch include a modulator having rising and falling edges extending in a linear fashion over time, the amount of the gradient of the rising and falling edges being selectable to be different. A sawtooth-shaped modulator signal may be used which may be inexpensive and uncomplicated to generate.

In an example embodiment according to the present invention, a matching controller has a plurality of feed-ins which supply one rectifier each, whose output currents are each brought together via a link-circuit reactor, and a switch is connected in series in such a manner that the link-circuit current is either supplied to a link-circuit capacitor buffering output voltage $U_=$of the matching controller, or is shunted upstream of this link-circuit capacitor, depending on the power demand of the consumer connected to the matching controller. This may provide that not only synchronously operating, but also asynchronously operating feed-ins may be used.

In an example embodiment according to the invention, the present output voltages of two or more matching controllers are parallel-connected via diodes for supplying a consumer.

The power made available may be increased as needed.

REFERENCE NUMERAL LIST

1 infeed controller
2 gyrator
3 matching transformer 4 transmission line
5 transformer head with power-factor correction capacitor
6 matching controller
7 consumer
21, 31, 61, 71 feed-in
22, 32, 62, 72 rectifier
23, 33, 63, 73 link-circuit reactor
25, 65 switch
26, 66, 51, 52 diode
27, 67 link-circuit capacitor
$I_=$ output current of the matching controller
$I_Z$ link-circuit current
$I_{ZV}$ smoothed signal of the link-circuit current
$I_{SZ}$ sawtooth-shaped modulator signal
$I_{ST}$ control signal
$I_A$ current source, output current of the gyrator
$I_U$ current in the transmission line
$U_{soll}$ setpoint voltage
$U_=$ output voltage of the matching controller
$U_A$ output voltage of the infeed controller
$C_G$ gyrator capacitance
$L_G$ gyrator inductance
U transformation voltage ratio of the matching transformer
$w_2$ number of turns of the transformer head
$f_M$ medium frequency
$K_D$ gain of the attenuator
$K_U$ gain of the voltage controller
$T_2$ time constant of the attenuator
$T_3$ delay-time constant of the connection-of-load
$S_{on}$ trip-on signal for switch The present invention is explained in detail below with reference to the Figures.

DETAILED DESCRIPTION

Figure 1:
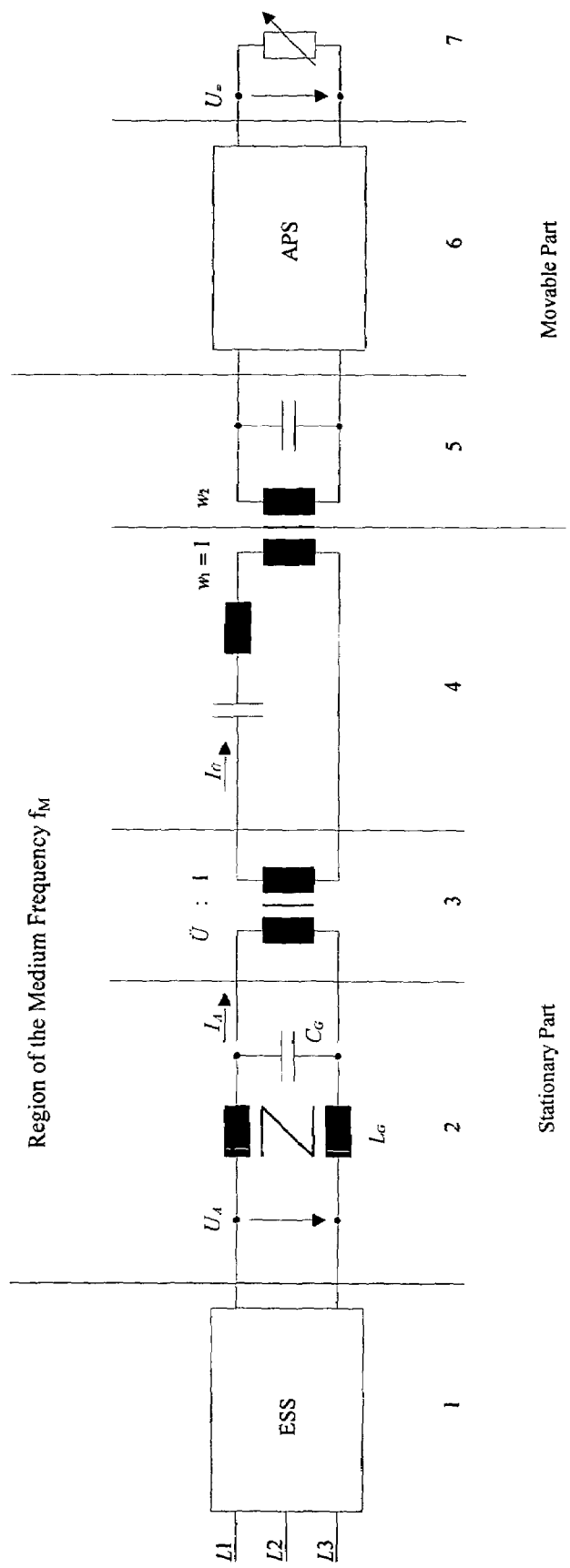
FIG. 1 is an exemplary schematic view for non-contact energy transmission having a matching controller 6.

FIG. 1 is a first exemplary schematic diagram for non-contact energy transmission having a matching controller 6. The schematic diagram includes a stationary and a movable part.

The stationary part includes an infeed controller 1, a gyrator 2, a matching transformer 3 and a transmission line 4.

Infeed controller 1 converts the low-frequency AC voltage received from the three-phase system (L1, L2, L3) into a medium-frequency voltage $U_A$ having a constant medium frequency $f_M$ of, for example, 25 kHz. A resonantly operated series resonant circuit, so-called gyrator 2, connected in series to infeed controller 1, represents a voltage-controlled current source $I_A$. Gyrator capacitance $C_G$ and gyrator inductance $L_G$ are rated or configured in accordance with medium frequency $f_M$ and the nominal power of infeed controller 1.

Current source $I_A$ feeds a matching transformer 3 whose transformation voltage ratio U is such that a medium-frequency current $I_U$, which is constant in its effective value, flows in transmission line 4, regardless of the nominal power of infeed controller 1.

The movable part includes a transformer head 5 having a power-factor correction capacitor, a matching controller 6 and a consumer 7. Transmission line 4 has an elongated conductor, to which coil windings of transformer head 5 are inductively coupled in such a manner that energy is transmitted to the movable part. In this context, transformer head 5 has a number of turns $w_2$, which determines the current intensity of a feed-in at matching controller 6.

Matching controller 6 converts the medium-frequency current, injected from transformer head 5, into a DC voltage $U_=$. In an exemplary embodiment, this voltage is used for feeding a conventional frequency converter as consumer 7, in order to implement a speed-adjustable drive on the movable part.

Figure 2:
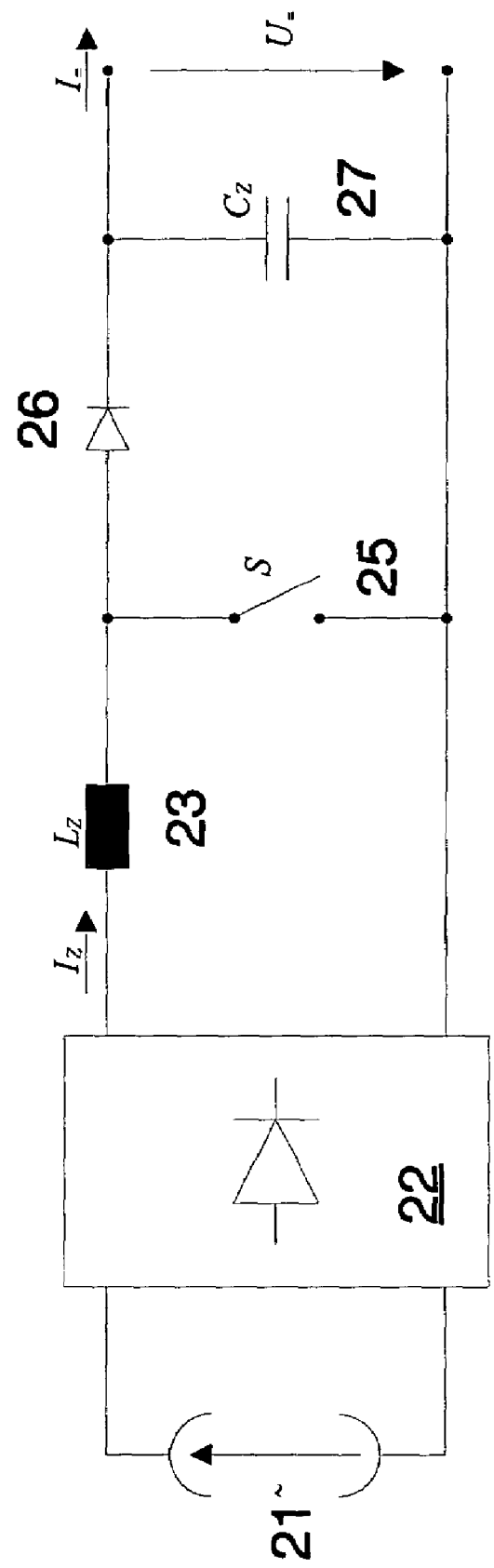
FIG. 2 is an exemplary schematic view of the matching controller having a feed-in 21.
Figure 4:
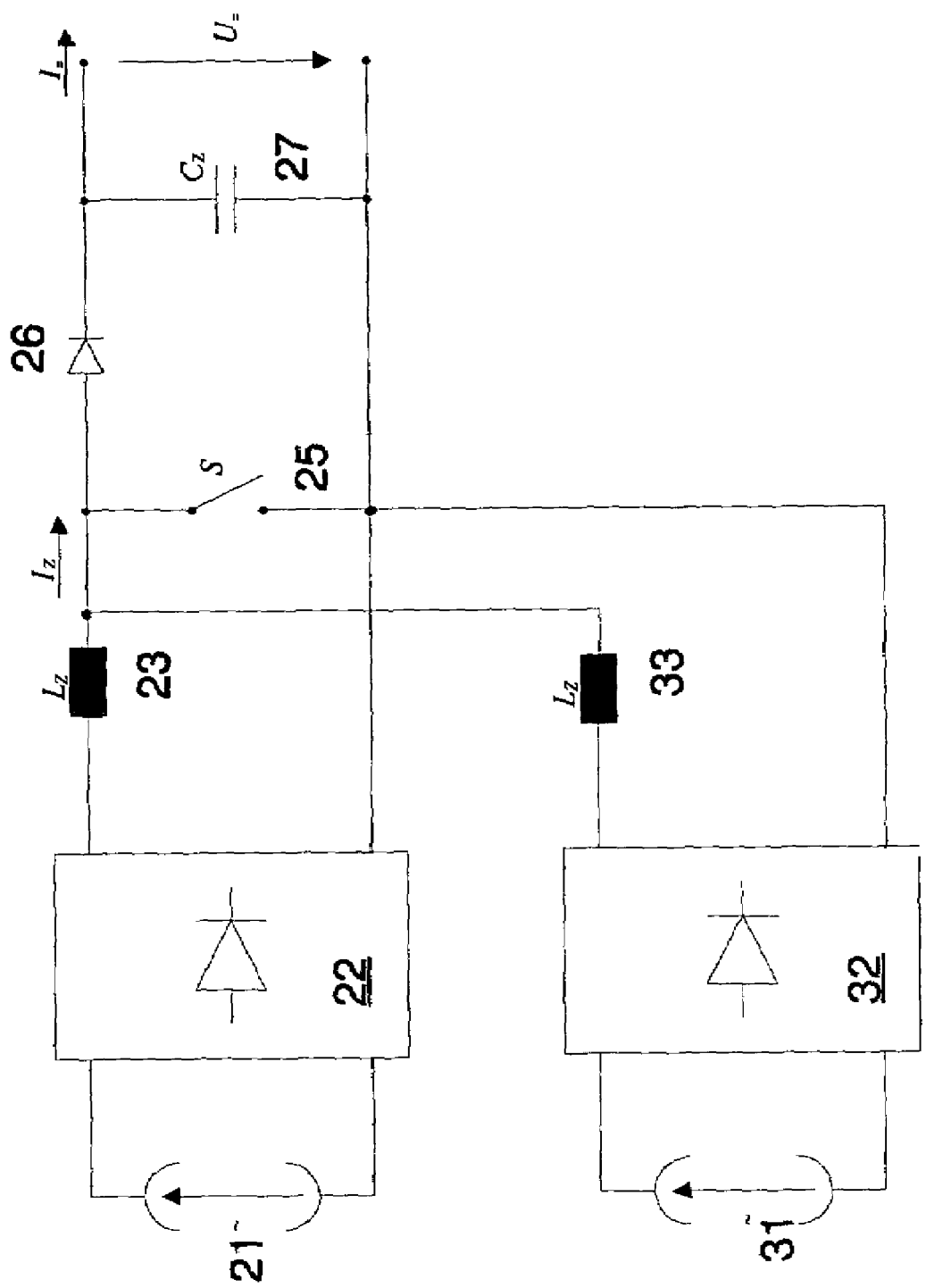
FIG. 4 is a schematic view, according to an example embodiment of the present invention, of a further matching controller having two feed-ins.

The current transferred from transmission line 4 to transformer head 5, in the case of FIG. 2, represents a feed-in 21, and in the case of FIG. 4, represents feed-in 21 and feed-in 31. As illustrated in FIG. 2, this current is rectified in a rectifier 22 of matching controller 6, is smoothed by a link-circuit reactor 23, and, with the aid of a switch 25, is either supplied to link-circuit capacitor 27 buffering output voltage $U_=$ of matching controller 6, or is shunted upstream of this link-circuit capacitor 27, depending on the power demand of consumer 7 connected to matching controller 6.

Figure 3:
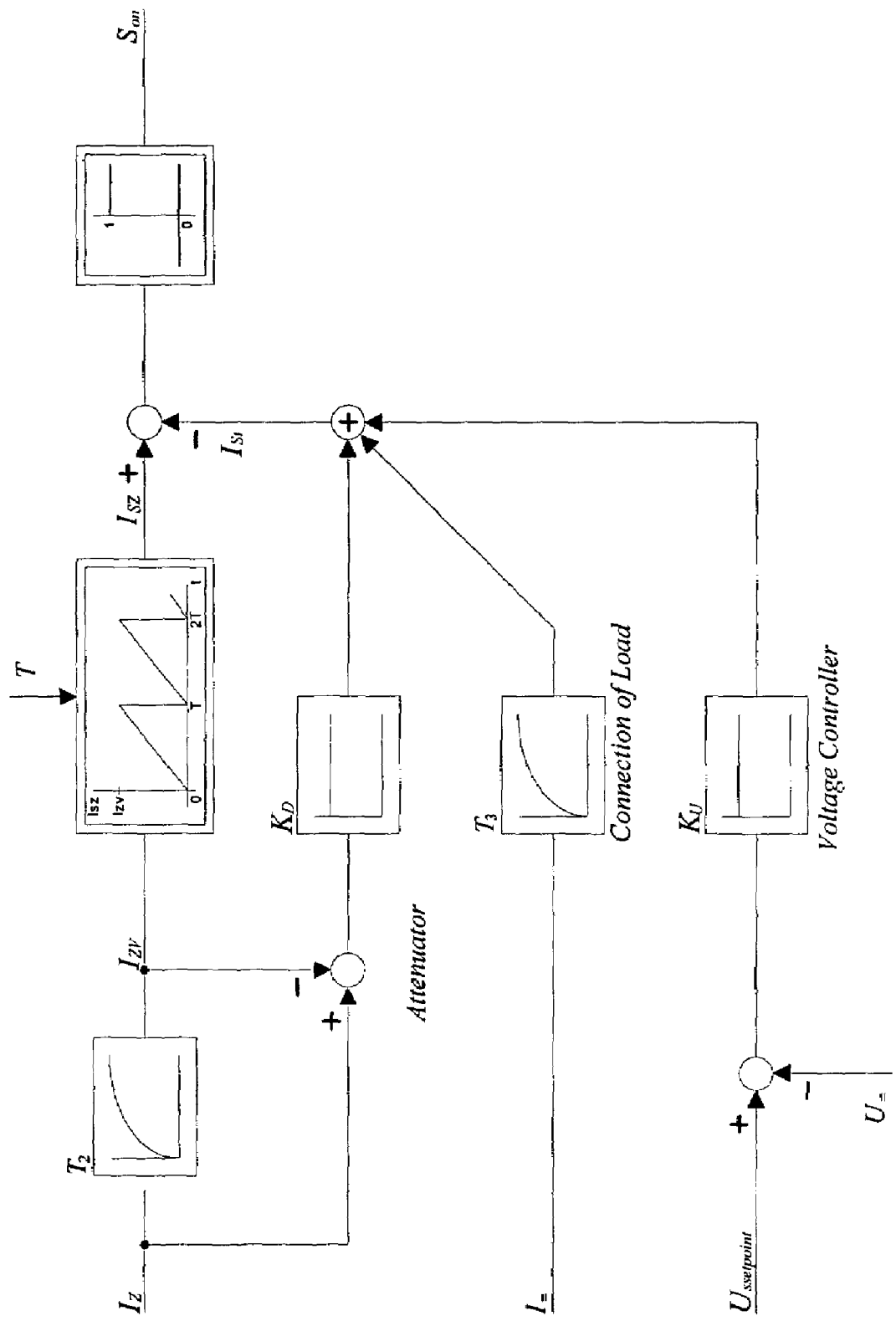
FIG. 3 is a schematic view of the control and driving of the matching controller for an exemplary embodiment according to the present invention.

FIG. 3 is a schematic view of the control and driving of switch 25 of the matching controller for an exemplary embodiment. Non-linear elements are double-framed, and linear elements are single-framed.

The linear part includes the following components: proportional-action voltage controller ("P-voltage controller") with gain $K_u$, connection-of-load with a delay time constant $T_3$, and attenuator, including time-delay element with time constant $T_2$ and proportional element with gain $K_D$.

The non-linear part includes a modulator and a two-point or two-position element which generates a trip-on signal $S_{on}$ for switch 25. The input quantity of the two-point element is formed from the difference between a sawtooth-shaped modulator signal $I_{SZ}$ and a control signal $I_{ST}$.

The amplitude of the sawtooth-shaped modulator signal is determined by smoothed signal $I_{ZV}$ of the link-circuit current. Frequency 1/T of the modulator signal is predefined asynchronously with respect to frequency $f_M$ of feed-in 21.

Control signal $I_{St}$ is composed of the sum of the output signals of the P-voltage controller, the connection-of-load and the attenuator.

The output signal of the P-voltage controller is yielded by the difference, weighted by a proportional element, between setpoint voltage $U_{setpoint}$ and output voltage $U_=$ of the matching controller.

To form the output signal of the connection-of-load, output current $I_=$ of the matching controller is supplied to a time-delay element with delay time $T_3$.

The output signal of the attenuator is yielded by the difference, weighted by a proportional element, between link-circuit current $I_Z$ and smoothed signal $I_{ZV}$ of the link-circuit current. The gain of the proportional element is $K_D$.

The control and driving may ensure the following functions:

The voltage controller is designed as a simple P-controller or proportional-action controller, since the connection-ofload preselects trip-on signal $S_{on}$ of switch 25 in a pre-controlling manner, which means the voltage controller is substantially unloaded.

The attenuator damps natural oscillations of link-circuit current $I_Z$ in the oscillatory configuration composed of inductive transformer head 5 with power-factor correction capacitor, rectifier 22 and link-circuit reactor 23.

In other exemplary embodiments of the present invention, instead of sawtooth-shaped modulator signal $I_{SZ}$, a periodic modulator signal having rising and falling edges extending in a linear fashion over time is used, the amount of the gradient of the rising and falling edges being selectable to be different. If the amount of the gradient of the two edges is equal, a triangular characteristic results.

Thus, in contrast to German Published Patent Application No. 197 35 624, not only may such a triangular modulator signal be used, but also in particular the sawtooth-shaped modulator signal which may be easy to generate and may be used in the exemplary embodiment of the present invention.

In the exemplary embodiments according to the present invention, amplitude and period duration T are each selected as in the case of the sawtooth-shaped modulator signal described. In this context, period duration T is selected as a fixed value from a 10%-wide tolerance band around $1/f_M$.

Therefore, the switching of switch 25 is asynchronous with respect to the characteristic of the current of feed-in 21.

There is no fixed phase relationship.

The switching losses of electronically designed switch 25 are essentially reversely proportional to switching frequency 1/T. Thus, sharply reduced switching losses result because of the large period duration T used.

The dimensioning of the link-circuit reactor is determined by the use of large period duration T, the asynchronous operation and the requirement that the link-circuit current not pulsate during operation, in order to ensure a continuous power flow. It may be provided when using this 10%-wide tolerance band that the link-circuit reactor has the smallest possible size, accompanied by the lowest possible switching losses.

For other exemplary embodiments according to the present invention, a value from a 50w-wide tolerance band around $1/f_M$ is also usable as period duration T.

For another exemplary embodiment of a matching controller according to the present invention, FIG. 4 is a schematic diagram having two feed-ins (21, 31). In this case, the supplied currents are each rectified in a rectifier (22, 32), smoothed by a link-circuit reactor (23, 33) and brought together. Using a single switch 25, link-circuit current $I_Z$ is either fed to link-circuit capacitor 27 buffering output voltage $U_=$ of the matching controller, or is shunted upstream of this link-circuit capacitor 27, depending on the power demand of the consumer connected to the matching controller.

In this manner, not only two synchronously operating feed-ins, but also two asynchronously operating feed-ins are usable for supplying the matching controller.

Thus, in a first exemplary embodiment of the present invention, the transformer heads draw energy from the same line. In this case, feed-ins 21 and 31 operate synchronously.

In a second exemplary embodiment of the present invention, the transformer heads draw energy from two different lines. In this case, each line is supplied by one infeed controller 1, the frequencies of the medium-frequency current source of respective infeed controllers 1 having at least small deviations. Feed-ins 21 and 31 operate asynchronously. This operation is made possible by smoothing the respective rectified current of corresponding feed-in (21, 31) using in each case a link-circuit reactor (23, 33) prior to bringing the currents together.

In other exemplary embodiments according to the present invention, the transformer heads draw energy from a plurality of different lines. In this case, each line is supplied by one infeed controller, the frequencies of the medium-frequency current source of the respective infeed controllers having small deviations. The feed-ins operate asynchronously. This operation is made possible only by smoothing the respective rectified current of the corresponding feed-in, using in each case a link-circuit reactor prior to bringing the currents together.

Figure 5:
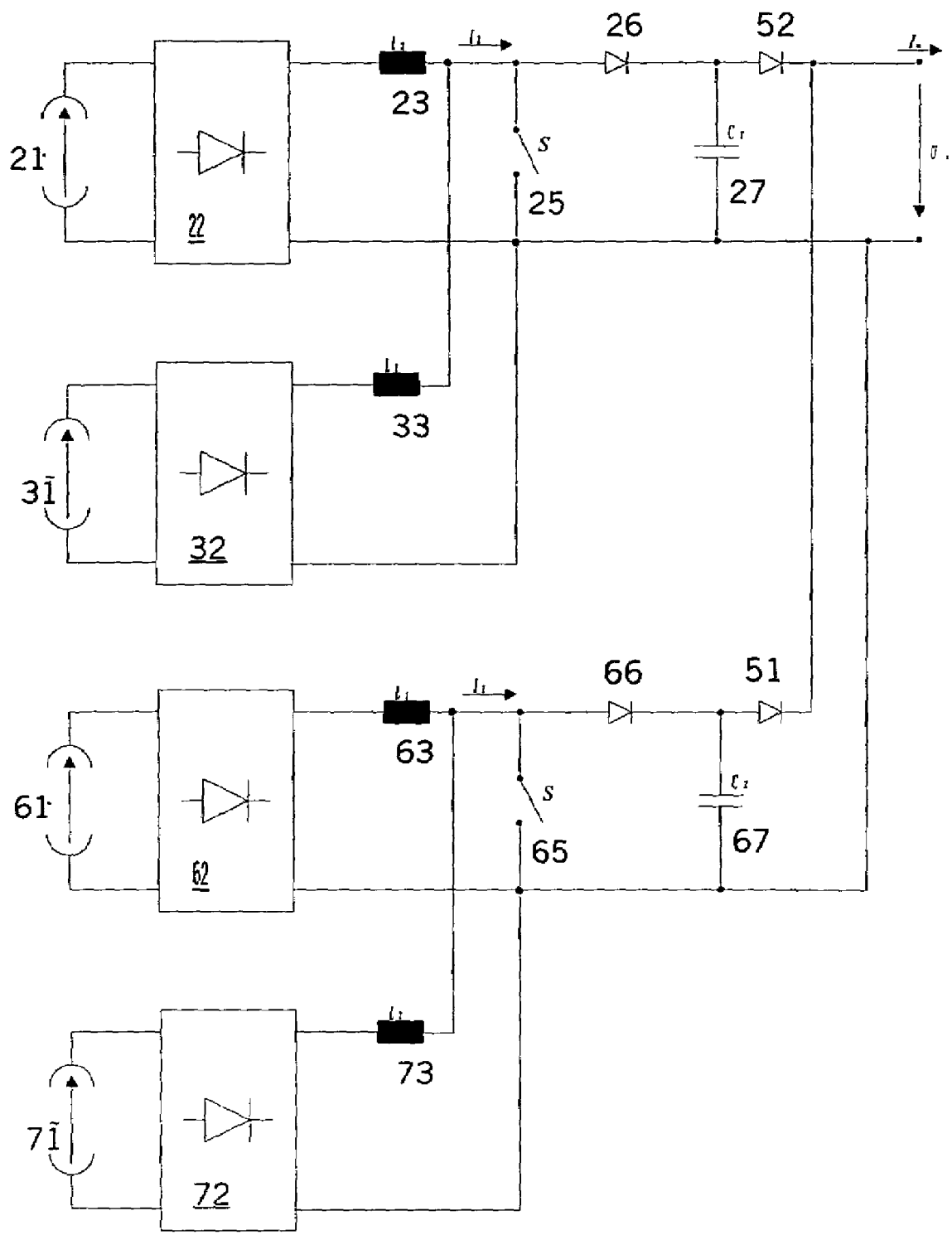
FIG. 5 is a schematic view having two matching controllers whose outputs are parallel-connected via diodes for an exemplary embodiment according to the present invention.

FIG. 5 is a schematic diagram for another exemplary embodiment of the present invention having two matching controllers that include different feed-ins (21, 31, 61, 71), rectifiers (22, 32, 62, 72), link-circuit reactors (23, 33, 63, 73) and diodes (26, 66), and whose outputs are parallel-connected via diodes (51, 52). Using switches (25, 65) operating independently of each other, the respective link-circuit current is either supplied to respective link-circuit capacitor (27, 67) or shunted upstream of it, depending on the power demand of the consumer.

The circuit diagrams and controls illustrated and described are to be understood only as schematic and exemplary.

In other exemplary embodiments of the present invention, the medium frequency deviates from the value of 25 kHz indicated for example. Medium frequencies in the range of 10 kHz to 50 kHz are also possible.

What is claimed is:

1. A method for non-contact transmission of electric power from at least one medium-frequency current source having a frequency including a deviation around a medium frequency to at least one moving consumer via at least one transmission line and transformer head allocated to the consumer, the consumer including a downstream matching controller configured to adjust the power received from the transmission line, comprising:

feeding a transmission line from a medium-frequency current source with a medium-frequency current that is constant during power transmission;

supplying a respective consumer with energy from at least one matching controller including at least one feed-in, at least one supplied current rectified in one rectifier, and smoothed by one link-current reactor;

in accordance with a switch, either supplying a link-circuit current to a link-circuit capacitor buffering output voltage of the matching controller or shunting the link-circuit current upstream of the link-circuit capacitor in accordance with a power demand of the consumers; and switching the switch at a switching frequency selected as a value based on the medium frequency; and limiting the switching frequency to less than double the medium frequency.

2. The method according to claim 1, wherein the switching frequency is between 0.5 and 1.5 times the medium frequency.

3. The method according to claim 1, wherein the switch is switched in the switching step either asynchronously with respect to at least one medium-frequency feed-in or periodically with a frequency so that there is no constant phase relationship to currents of at least one feed-in.

4. The method according to claim 1, wherein the link-circuit reactor is configured so that the link-circuit current does not pulsate during operation.

5. The method according to claim 1, wherein the frequencies of the medium-frequency feed-ins have deviations around the medium frequency.

6. A device, comprising:
an arrangement configured to perform a method for non-contact transmission of electric power from at least one medium-frequency current source having a frequency including a deviation around a medium frequency to at least one moving consumer via at least one transmission line and transformer head allocated to the consumer, the consumer including a downstream matching controller configured to adjust the power received from the transmission line, the method including:
feeding a transmission line from a medium-frequency current source with a medium-frequency current that is constant in an effective value during power transmission;
supplying a respective consumer with energy from at least one matching controller including at least one feed-in, at least one supplied current rectified in one rectifier each, and smoothed by one link-current reactor each;
in accordance with a switch, either supplying a link-circuit current to a link-circuit capacitor buffering output voltage of the matching controller or shunting the link-circuit current upstream of the link-circuit capacitor in accordance with a power demand of the consumers; and
switching the switch at a switching frequency selected as a value based on the medium frequency and limiting the switching frequency to less than double the medium frequency; and
an arrangement configured to drive the respective switch not including a device for synchronization of the switching of the switch to the medium-frequency feed-ins.

7. The device according to claim 6, wherein the arrangement configured to drive the switch includes a modulator having rising and falling edges extending in a linear fashion over time, an amount of a gradient of each of the rising and falling edges selectable to be different.

8. The device according to claim 7, wherein the modulator includes a sawtooth voltage generator.

9. The device according to claim 6, wherein the matching controller includes a plurality of feed-ins that supply one rectifier each, having output currents connected via the link-circuit reactors, and switches series-connected so that the link-circuit current is either supplied to the link-circuit capacitor buffering the output voltage of the matching controller or shunted upstream of the link-circuit capacitor in accordance with the power demand of the consumer connected to the matching controller.

10. The device according to claim 6, further comprising diodes, output voltages of at least two matching controllers parallel-connected via the diodes to supply a consumer.

11. A device, comprising:
means for performing a method for non-contact transmission of electric power from at least one medium-frequency current source having a frequency including a deviation around a medium frequency to at least one moving consumer via at least one transmission line and transformer head allocated to the consumer, the consumer including a downstream matching controller configured to adjust the power received from the transmission line, the method including:
feeding a transmission line from a medium-frequency current source with a medium-frequency current that is constant in an effective value during power transmission;
supplying a respective consumer with energy from at least one matching controller including at least one feed-in, at least one supplied current rectified in one rectifier each, and smoothed by one link-current reactor each;
in accordance with a switch, either supplying a link-circuit current to a link-circuit capacitor buffering output voltage of the matching controller or shunting the link-circuit current brought together upstream of the link-circuit capacitor in accordance with a power demand of the consumers; and
switching the switch at a switching frequency selected as a value based on the medium frequency and limiting the switching frequency to less than double the medium frequency; and
means for driving the switch not including means for synchronization of the switching of the switch to the medium-frequency feed-ins.

* * * * *